United States Patent [19]

Thomas

[11] Patent Number: 5,087,159
[45] Date of Patent: Feb. 11, 1992

[54] METHOD OF USING END MILLING TOOL
[75] Inventor: Robert F. Thomas, Franklin, Mass.
[73] Assignee: A. S. Thomas, Inc., Westwood, Mass.
[21] Appl. No.: 585,475
[22] Filed: Sep. 20, 1990
[51] Int. Cl.[5] .............................................. B23C 3/02
[52] U.S. Cl. ..................................................... 409/132
[58] Field of Search .............. 409/131, 132, 139, 191, 409/200, 199, 84; 51/281 P, 327

[56] References Cited

U.S. PATENT DOCUMENTS

| | | | |
|---|---|---|---|
| 3,863,525 | 2/1975 | Cale | 409/199 |
| 3,910,159 | 10/1975 | Gladwin | 409/199 |
| 4,104,943 | 8/1978 | Calderoni | 409/191 |
| 4,245,939 | 1/1981 | Sear | 409/200 X |
| 4,850,761 | 7/1989 | Brever et al. | 409/132 |
| 4,968,195 | 11/1990 | Hayakawa et al. | 409/84 |

FOREIGN PATENT DOCUMENTS 1180241  9/1985  U.S.S.R. ............................ 409/191

OTHER PUBLICATIONS

"Milling Spherical Surfaces", Miroshnichenko et al., Jul. 1979, Industrial Studies.

*Primary Examiner*—William Briggs
*Attorney, Agent, or Firm*—Fish & Richardson

[57] ABSTRACT

An end cutting milling tool designed for rotation about a cutting axis and having a cutting end and a base end adapted for engagement by a means for rotation, the tool having cutting blades provided within and located at an outer boundary defined by a surface of rotation about the cutting axis, the boundary having a diameter D2 at the cutting end and a spherical surface at the cutting end having a radius of curvature with an origin on the cutting axis, the radius of curvature having a magnitude, R1, that is greater than D2/2 and is less than 50 times D2, the boundary having a flank portion extending from the cutting end toward the base end.

6 Claims, 1 Drawing Sheet

METHOD OF USING END MILLING TOOL

BACKGROUND OF THE INVENTION

The invention relates to end cutting milling tools and methods of using them to mill concave surfaces.

An end cutting milling tool is rotated about a cutting axis and has a cutting end and has cutting blades at the cutting end and along the flank for removing material from a workpiece contacted by the blades. In one mode of operation the tool, the cutting axis is maintained generally perpendicular to a desired surface on the workpiece, and the tool is moved generally transversely to the cutting axis across the workpiece while the tool is rotating about its axis to remove material. Flat end cutting milling tools have flat bottoms at the cutting ends. These tools often make a small angle between the cutting axis and vectors normal to the desired surface of the workpiece so that cutting occurs at an edge of the cutting end. Another type of end cutting milling tool is a ball end milling tool, which has a hemispherical cutting end; i.e., the radius at the cutting end is one-half the tool diameter at the cutting end. End cutting milling tools are provided with a variety of blades or other cutting surface components. Examples of end cutting milling tools and methods of their use are described in U.S. Pat. Nos. 4,850,761; 4,662,117; and 4,104,943. Such tools can also cut by having the flank portions contact the workpiece.

SUMMARY OF THE INVENTION

The invention features in general an end cutting milling tool having cutting members provided within and located at a boundary defined by a surface of rotation about the cutting axis. The boundary has a diameter D2 at a cutting end of the tool and a spherical surface at the cutting end that has a radius of curvature with an origin on the cutting axis and a magnitude, R1, that is greater than D2/2 and is less than 50 times D2. The milling tool is desirably used to mill concave surfaces, and R1 is less than the minimum radius of curvature of a concave surface portion of the workpiece. The tool desirably provides a very good surface finish. The tool also produces shallower scallops on the workpiece as compared to flat end milling tools, permitting fewer passes for a given scallop height, thereby reducing the number of passes needed to machine a given part.

In preferred embodiments, the tool is tapered and increases in diameter along the flank portion from D2 at the cutting end. The tool has a blending radius of magnitude R2 at the junction of the spherical surface of the cutting end and the flank portion. The tool is made of high speed steel or carbide. When milling, there is an angle β between the cutting axis and normal vectors of the workpiece, β being less than or equal to arcsin D2/2R1 and greater than arcsin D2/4R1. The cutting involves generally moving in a direction of the angle of tilt.

Other advantages and features of the invention will be apparent from the following description of a preferred embodiment thereof and from the claims.

DESCRIPTION OF THE PREFERRED EMBODIMENT

The embodiment will now be described.

DRAWINGS

STRUCTURE

Figure 1:
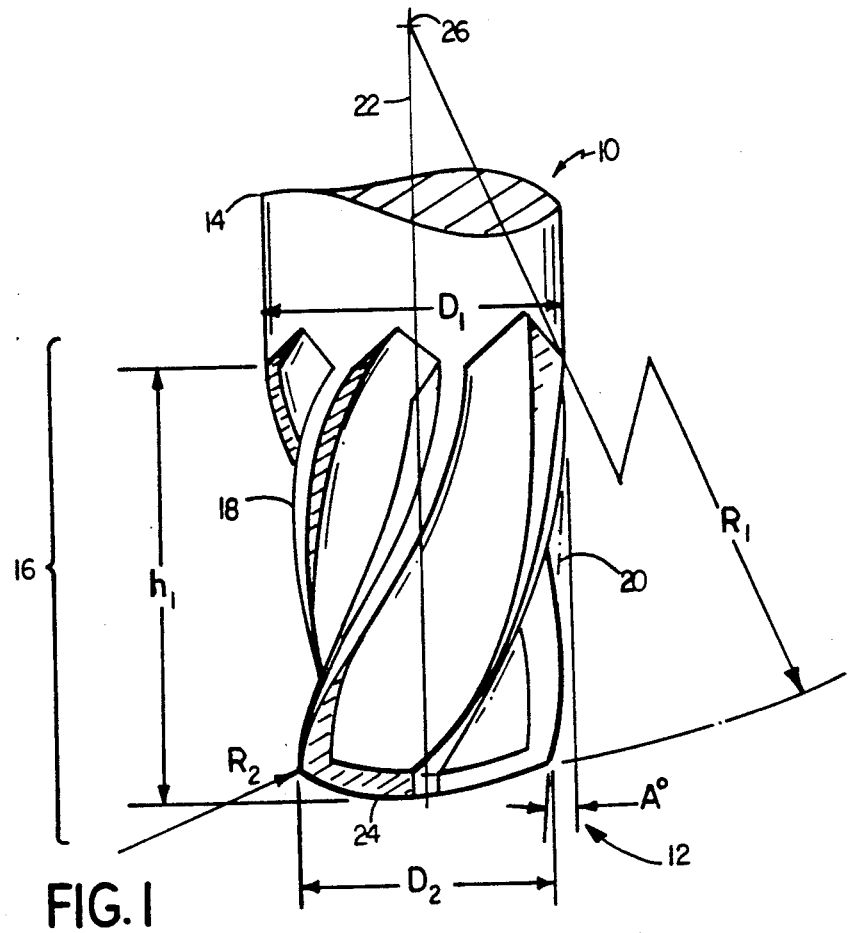
FIG. 1 is an partial elevation showing an end cutting milling tool according to the invention.

Referring to FIG. 1, there is shown milling tool 10 having cutting end 12, base end 14 (which is only partially shown in FIG. 1), and flank portion 16 having cutting blades 18 extending along it from cutting end 12. Cutting blades 18 are provided within and have cutting edges located at outer boundary 20, which is defined by a surface of rotation about cutting axis 22 about which milling tool 10 is rotated. Boundary 20 has a diameter D2 at cutting end 12 and a spherical surface 24 at cutting end 12 having a radius of curvature with an origin 26 on cutting axis 22 and a magnitude R1. R1 is greater than D2/2 and is less than 50 times D2. R1 also is less than the minimum radius of curvature R3 shown on FIG. 2 for a concave surface of workpiece 28. Tool 10 has a blending radius of magnitude R2 at the junction of spherical surface 24 and flank portion 16. Tool 10 is preferably made of carbide but can also be made of high speed steel. A taper at angle A is provided from D2 to D1; this facilitates resharpening tool 10 after wear of the blades.

Operation

In operation, tool 10 is engaged by a five-axis CNC machining center that provides movement of the tool about five axes. The control of the machining center to move tool 10 to machine a desired concave surface is according to techniques known in the industry, as, e.g., described in "Nuform: the Universal N/C Language" by Curtis Reichold in *N/C Comline* (October, 1974).

Figure 2:
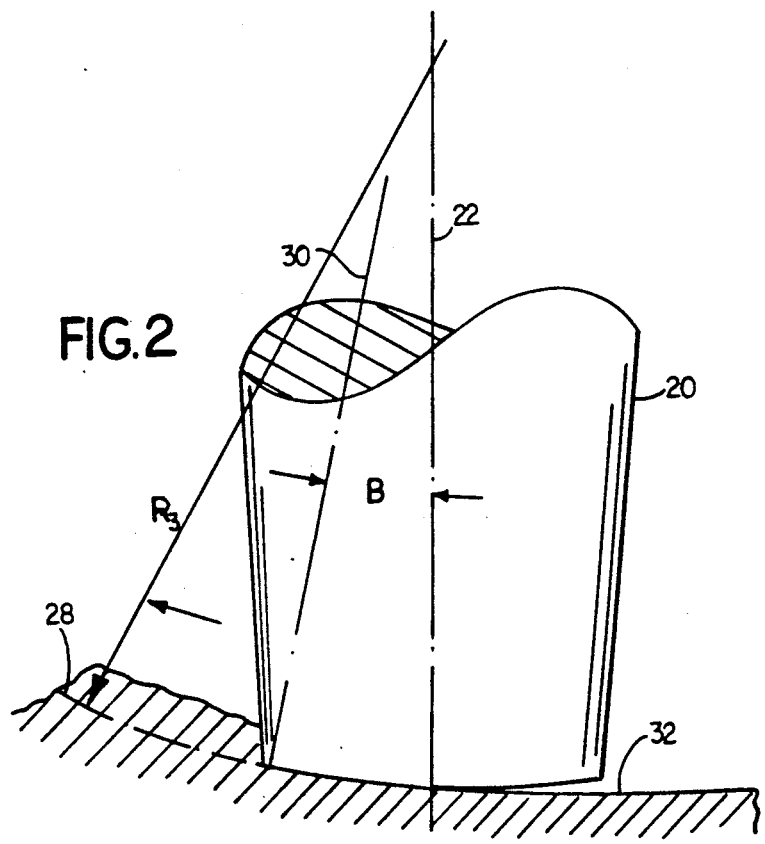
FIG. 2 is a diagrammatic view, partially in section, indicating the movement of the FIG. 1 milling tool on a surface of a workpiece.

Referring to FIG. 2, during such machining, cutting axis 22 of milling tool 10 is maintained at an angle β to normal vectors 30 to the desired surface 32 of workpiece 28. It is desirable to have the contact of spherical surface 24 be closer to its outer edge than to its center; thus the angle β should be greater than arcsin D2/4R1 and less than or equal to arcsin D2/2R1. Because tool 10 has a blending radius R2, and it is desired to design the contact to be 0.05" inward from the blending radius to guarantee that the contact is not on the blending radius when considering tolerances of manufacture, β can be set to arcsin (D2/2−R2 −0.05")/R1. Milling tool 10 is rotated about cutting axis 22, which is oriented at an angle β to the normal vector 30 during movement of tool 10 along workpiece 28. Tool 10 is moved in a direction from the cutting axis 22 to the normal vector 30 and is moved as necessary by the five-axis machine to sweep out the desired surface 32, which could curve in all directions. The angle β between the cutting axis and the normal vector that passes through origin 26 is maintained as the normal vector changes in orientation as the tool is moved across the surface.

Because spherical end surface 24 is of large radius, the scallop heights (between adjacent passes on the workpiece surface) are less than they would be for a flat end milling tool. In addition, a much larger radius can be provided at the spherical end than is provided on ball end milling tools while still using a small tool diameter D1. A further advantage of the tool and method is that the use of spherical end 24 provides a much finer finish to the resulting surface 32 than prior techniques.

If the concave surface has a portion with a small radius of curvature and other portions with larger radius of curvature, tool 10 with R1 less than the small radius of curvature could be used for the portion with that radius of curvature, and another tool or tools could be used for the other portions of the concave surface and other surfaces.

An advantage of tool 10 is that relatively small turbine blade parts, e.g., less than 2" wide and 4" long, can be machined with a spherical radius of 5" or larger. A ball end milling tool with a 5" radius is extremely expensive and is too large to be effectively utilized on such small parts. It also would be larger than could be handled by many multiaxis milling machines. Tool 10 also provides very efficient cutting action. Because the bottom of surface 24 is a small section of a sphere and the region of contact with the workpiece is close to the blending radius, tool 10 has good metal removal capabilities, similar to those of a flat end milling tool. The finished surface cut by the large spherical radius of surface 24 closely follows the curvature of the concave surface, resulting in a superior surface finish.

An illustrative example of a milling tool 10 designed to machine a particular workpiece 28 will now be described. Workpiece 28 is a turbine blade having a minimum radius of concave curvature R3 of 10.1". The maximum diameter D1 for tool 10 which the five-axis machine could hold in the spindle is 1.75". The blade must be to size at 0.5" from the base, and a maximum scallop height of 0.0005" and an overall surface finish better than 64 microinches are desired. The raw stock material is 410 stainless steel and is provided from 0.5" to 0.1" oversize. A tool 10 with the following dimensions is chosen: D1=1.25", D2 =1.00", R1=10.00", R2=0.0325", and h=3.0". The tool is fabricated from high speed steel with six flutes, i.e., blades 18. An angle $\beta$ of 2.6° is selected for machining the concave surface in order to have spherical surface 24 cut as close as possible to blending radius R2 to provide optimal cutting action. Thus tool 10 is tilted 2.6° in advance of normal vectors 30 during machining of the concave portion of the surface. A distance between tracks of 0.2" was calculated to yield the desired scallop height.

Other Embodiments

Other embodiments of the invention are within the scope of the following claims. For example, other types of blades or cutting members can be employed so long as boundary 20 is maintained. Thus, other standard configurations for milling cutters such as those with ceramic inserts and those in a shell mill configuration can be employed. Also, the tool can be made with a center hole along axis 22 to meet the needs of machine tools having through spindle coolant or external flood coolant.

What is claimed is:

1. A method of machining a workpiece to have a desired surface including a concave surface portion with a minimum radius of curvature R3 comprising
   providing an end cutting milling tool that is rotated about a cutting axis,
     said tool having a cutting end and a base end adapted for engagement by a means for rotation,
     said tool having cutting blades provided within an outer boundary defined by a surface of rotation about said cutting axis,
     said boundary having a diameter D2 at said cutting end and a spherical surface at said cutting end having a radius of curvature with an origin on said cutting axis,
     said radius of curvature having a magnitude, R1, that is greater than D2/2, and less than R3,
     said boundary having a flank portion extending from said cutting end toward said base end,
   rotating said tool about said cutting axis, and
   moving said tool as it is rotating so as to cut said workpiece by contact of said cutting end with said workpiece.

2. The method of claim 1 wherein said concave surface of said workpiece has normal vectors to it, and said moving includes moving said tool across said surface such that said cutting axis makes an angle $\beta$ between said cutting axis and a said normal vector passing through said origin of said radius of curvature, said angle $\beta$ being less than or equal to arcsin D2/2R1 and greater than arcsin D2/4R1.

3. The method of claim 2 wherein said cutting involves moving in a direction from said cutting axis to said normal vector.

4. The method of claim 2 wherein said cutting tool has a blending radius of magnitude R2 at the junction of said spherical surface with said flank portion of said boundary, and wherein $\beta$ is less than arcsin (D2−R2)/2R1.

5. The method of claim 4 wherein $\beta$ is less than or equal to arcsin (D2−R2−0.05")/2R1.

6. The method of claim 5 wherein said concave surface portion is part of a larger concave surface having other portions with radii of curvature larger than said minimum radius of curvature, and a different tool is used to cut said other portions.

* * * * *

UNITED STATES PATENT AND TRADEMARK OFFICE
CERTIFICATE OF CORRECTION

PATENT NO.  : 5,087,159

DATED       : February 11, 1992

INVENTOR(S) : Robert F. Thomas

It is certified that error appears in the above-identified patent and that said Letters Patent is hereby corrected as shown below:

Col. 4, claim 6, line 46, "5" should be --1--.

Signed and Sealed this

Third Day of August, 1993

Attest:

MICHAEL K. KIRK

Attesting Officer

Acting Commissioner of Patents and Trademarks